United States Patent Office
3,298,347
Patented Jan. 17, 1967

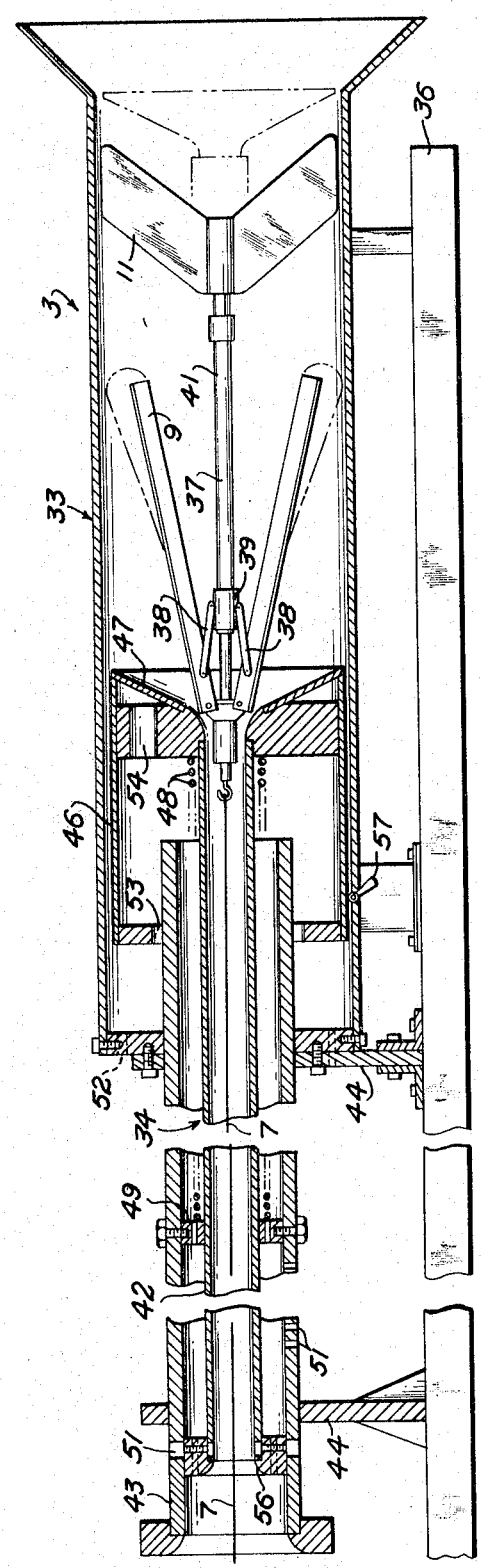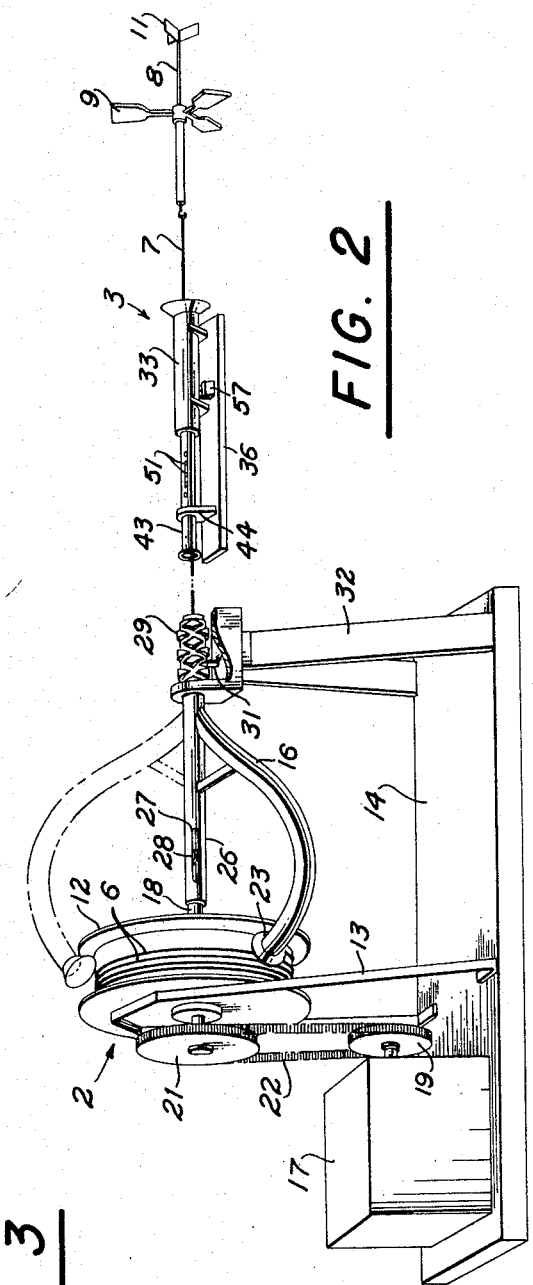

3,298,347
SUBMERSIBLE TOWING APPARATUS
Arthur F. Swain, Spring Valley, and Frank R. Abbott, San Diego, Calif., assignors to the United States of America as represented by the Secretary of the Navy
Filed Oct. 21, 1965, Ser. No. 500,443
8 Claims. (Cl. 114—235)

The invention described herein may be manufactured and used by or for the Government of the United States of America for governmental purposes without the payment of any royalties thereon or therefor.

Although the present apparatus may be utilized for towing a variety of objects, it has been developed particularly for the purpose of towing long, cable-like, multiple-beam sonar hydrophone arrays. More specifically, these hydrophone arrays are flexible elements which may be about the diameter of a garden hose and may extend up to one thousand feet in length. Although there are a number of different types of arrays, one common type employs piezoelectric elements which serve as sound pressure sensors and these elements may be separated at precise distances one from the other by compliant plastic or rubber spacers which provide the requisite flexibility. When towed behind a submarine, the straight line configuration of the array provides definite acoustical advantage particularly in defining the direction of a source of underwater sound.

Although, as indicated, the use of such arrays is advantageous, there are real problems which arise especially in stowing the array on a submarine and in deploying the array when its use is desired. Obviously, one manner of stowing the arrays is to employ a reel, although, since the length of the array is substantial, the reel dimensions are sizable and the power needed to drive such a large reel becomes quite considerable. Because of the power requirements, slip rings, brushes and other electrical connections must be employed and these, in turn, create sources of electrical noise of a signal level which are particularly undesirable in submarine operations.

A further discouraging factor has been the high casualty rates of these relatively expensive tows. One cause of the breakage is due to the fact that the array becomes fouled by the propeller of the submarine. Also, because of the manner in which the arrays are constructed, they do not have the strength to withstand sudden pulls or extreme tensile forces.

It is therefore an object of the present invention to provide apparatus for use on a submarine for stowing arrays of the type described, the apparatus being relatively small and requiring relatively low power for operation.

A further object is to provide means associated with the aforementioned apparatus for minimizing the possibility of the array becoming fouled in a submarine propeller.

Yet another object is to provide a reel on which the array itself may be stowed, the reel being of sufficiently small dimensions to permit its being mounted externally of the submarine.

Another object which will be clarified in the ensuing detailed description is to provide a special means for ejecting the array at the time it is desired to deploy the tow.

Other objects and their attendant advantages also will become apparent in the detailed description of the invention.

Generally considered, the invention provides a combination of elements including a reel preferably disposed medially of the submarine either interiorly or exteriorly of its hull. The tow itself, in addition to including the acoustic array or such other line-like objects as may be desired, includes a tow line, such as a relatively strong cable, adapted to be wound onto the reel in advance of the acoustic array. Also secured to the trailing end of the acoustic array is another line which, most suitably and for reasons to be described, has some resiliency. This last resilient line, in turn, is secured to a drogue component which, when the tow has been reeled out provides a tensioning or drag force to maintain the tow in a straight line configuration.

Special means also are provided for receiving and stowing the drogue, this means being in the form of a casing which is mounted externally of the submarine on its extreme rearward end. As will be appreciated, when the submarine is operating in a submerged condition with the drogue member stowed in the casing, the pressure of surrounding water would tend normally to prevent the drogue from being rejected rearwardly from the casing. Consequently, a further feature of the invention is the provision of a special drogue ejector means which offsets the restraining water pressure so that the drogue and the remainder of the tow can be deployed into operating position. It is believed that the particular features of this special ejector means best can be understood from the detailed description of the invention.

The invention is illustrated in the accompanying drawings of which:

FIG. 2 is an enlarged perspective of the towing apparatus itself; and

FIG. 3 is a vertical section through a drogue stowage funnel.

Figure 1:
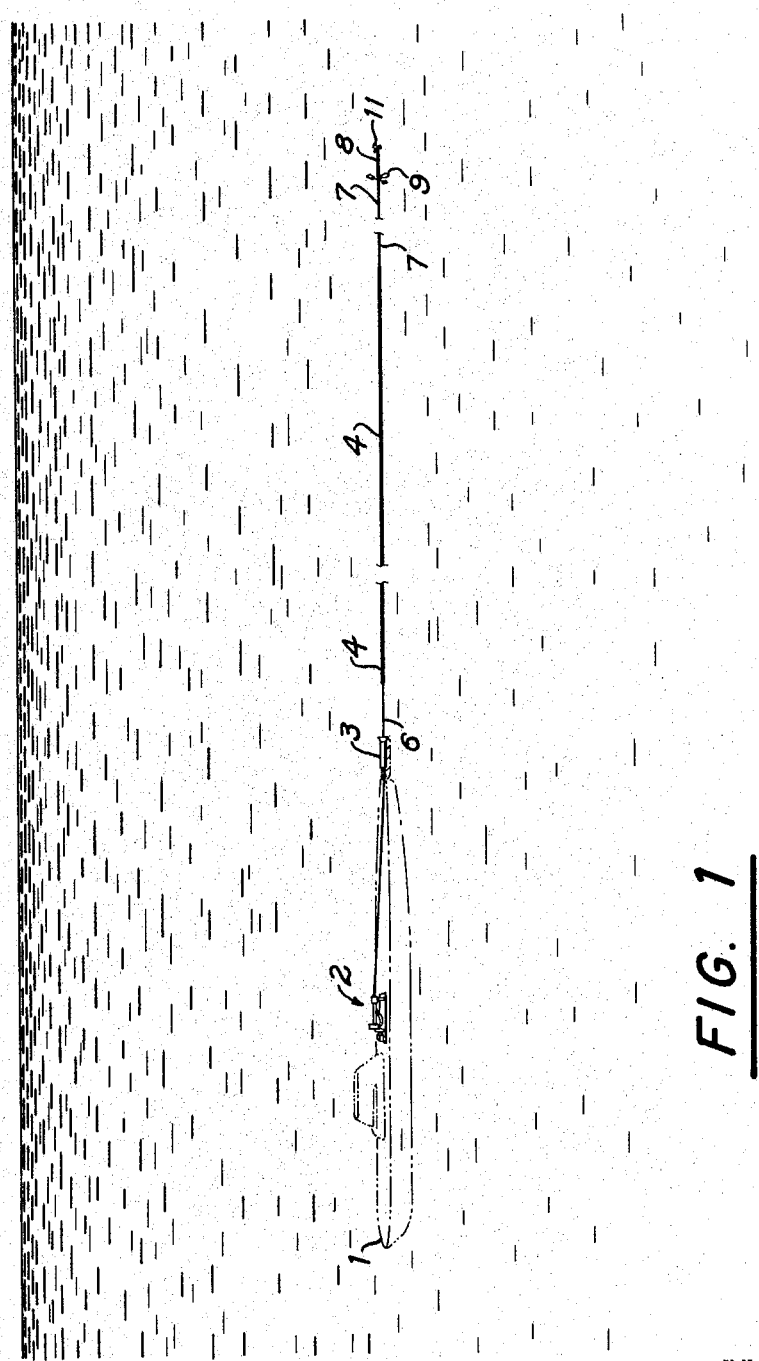
FIG. 1 illustrates a submarine traveling in a submerged position and carrying the towing apparatus of the present invention.

Referring to FIG. 1, it will be seen that the submarine mounts a reel 2 and a so-called drogue stowage casing or funnel 3, both of these components providing important features of the invention. Also, this figure is intended to depict a condition in which the submarine is towing a previously-described hydrophone array 4 and it should be noted that the complete tow includes a tow line or cable 6, wound on the reel prior to array 4, as well as a resilient line 7 the purposes of which will become apparent. A so-called drogue 8 is secured to the trailing end of line 7 and it will be seen in FIG. 1 that drogue 8 has radially extending arms 9 as well as a stabilizer member 11. Arms 9 resist the forward movement of the tow and consequently hold the tow in a taut condition.

Reel 2 is mounted medially of the submarine and the tow line extends from the reel axially through stowage funnel or casing 3. At this point, it can be appreciated that if the tow line were not guided rearwardly through casing 3 it would be free to move around in an uncontrolled manner and eventually the line would become fouled by the rudder.

The details of the previously mentioned components are better shown in FIGS. 2 and 3. Referring first to FIG. 2, it will be noted that the apparatus employs the stationary reel 12 supported in a fixed position by a frame 13 which, in turn, is mounted on a platform or base 14 secured to the exterior surface of the hull of the submarine. The cable of the tow is reeled out or in by a rotating serpentine or spiral tube 16 which is capable of being rotatively driven in opposite directions. When driven in one direction, the spiral tube picks up the cable and feeds it rearwardly through stowage casing 3 and when driven in the opposite direction the spiral winds the cable onto the reel much in the manner of thread being wound onto a spool. The drive for spiral tube 16 is provided by motor mounted in a casing 17, the drive of the motor being imparted to a horizontal shaft 18 by a pair of sprockets 19 and 21 and a chain 22. Casing 17 also will include appropriate clutch mechanism capable of reversing the rotational direction of the drive and, with exceptions that will be pointed out, the control of the drive is achieved by an operator in the control room of the submarine.

Another important feature of the reel is that spiral tube 16 is capable of reciprocating as it is rotated so as to reciprocate its funneled mouth portion 23 relative to the cable receiving surface of the reel. The obvious purpose of this reciprocation is to avoid bunching of the cable on the reel. Such bunching is particularly undesirable since this reel may at times be used in a submerged condition. If the spiral tube were not reciprocated, the lines would be wound onto the reel in a triangular form so that eventually the wind at the apex of the triangular would snap to the outside and leave a loose loop which the surrounding water then could pick up and completely remove from the reel. The reciprocation prevents backlash which easily could destroy the hydrophone array.

To achieve reciprocation of spiral tube 16, a hollow tube 26 is telescopically mounted on the end of drive shaft 18. Also, hollow tube 26 is provided on each side with slots 27 and shaft 18 is drivably coupled to tube 26 by radially extending keys 28. Consequently, shaft 18 rotatably drives tube 26 although the tube is free to reciprocate relative to the shaft during the drive. To achieve the desired reciprocation, the end portion of tube 26 is provided with screw-like threads 29 engaged by a stationary dog 31 mounted on a pillow block which, in turn, is supported by triangular stanchions 32 carried by base 14. Threads 29, of course, are arranged to cause tube 26 to reciprocate as the tube is rotated relative to the stationary dog 31.

In practice, it has been found most desirable to design screw threads 29 in such a way that the line is not wound onto loops which will bind preceding loops. To accomplish this, the reciprocation is so related to the circumference of the reel that spaces are left between each successive loop. The result is that, as these spaces are filled during the return traverses of the spiral tube, the line criss-crosses on the reel and provides the desired binding effect. Again, since the reel is to be used underwater, the level wind mechanism is not desirable since in such an event, any looseness of any loop could easily cause the loop to be washed off of the reel.

FIG. 3 illustrates the structural details of drogue stowage funnel or casing 3. Generally, member 3 includes the stowage casing itself designated by numeral 33 and a drogue ejecting mechanism designated by numeral 34. Casing 33, as well as the ejecting mechanism, is supported in any suitable manner on a base or platform 36 which platform most suitably is supported on the propeller guard of the submarine so that after end of the casing extends outwardly over the rear of the submarine. As would be surmised, drogue 8 is pulled into its illustrated stowed position by the tow line and to permit the stowage, radial arms 9 of the drogue are collapsable. More specifically, arms 9 have their forward ends hinged to a collar carried by shaft 37 of the drogue and the arms also are coupled by levers 38 to another collar 39 which is slidably mounted on shaft 37 and which is urged forwardly of the shaft by a spring 41. Thus, when the drogue is ejected, spring 41 causes the arms to assume the radial position which creates the desired tension on the line. Further, when the drogue is pulled into stowed position, the arms collapse and, to facilitate the collapse, the trailing end of the casing is funnel-shaped. The funnel-shape of the casing also guides the drogue into the casing.

Ejector member 34 is needed to initially force the drogue rearwardly out of the casing. As has previously been noted, when the submarine is running submerged, there is required some positive force to move the drogue outwardly against the pressures and eddy currents of the surrounding water medium. Member 34 essentially in an elongate piston-like member having a stem portion 42 supported in a concentric stationary tube or cylinder 43. Cylinder 43 is supported by stancions 44 on base 36. As may be noted in FIG. 3, the rearward end of cylinder 43 projects into casing 33 and is supported by the end walls of this casing. Stem 42 of the ejector member also projects inwardly into casing 33 and at its inner end is formed into a plunger-like piston 46 which rides against the interior surfaces of the casing. The rearward wall of the plunger also is provided with funnel shaped flanges 47 to guide the drogue.

The ejector is moved rearwardly by a coil spring 48 and also by water pressure itself. Spring 48 abuts an interior wall of plunger 46 at one end and also abuts a stationary disc 49 at its other end. As stated, water pressure is employed to supplement the rearward press of coil spring 48 and to provide the water pressure, cylinder 43 is formed with a plurality of openings 51, while the end wall of casing 3 also is provided with openings 52 and the front and rear walls of plunger 46 with openings 53 and 54. Consequently, when line is paid off of the reel, both the spring and the flow of water move the ejector plunger 46 rearwardly, the plunger carrying the drogue and forcing it rearwardly out of casing 3. In addition to providing an abutment for coil spring 48, collar or disc 56 also provides a stop member to limit the rearward movement of the ejector piston. In other words, the piston moves rearwardly until a flared front collar of ejector stem member 42 strikes collar 49. It also should be noted that collars 56 and 49 both also are provided with the plurality of openings through which the water can flow.

The controls for the reel can best be understood with reference to the operation of the apparatus as a whole. Considering first a condition in which the drogue is being towed at a substantial distance from the submarine, the operator in the submarine can initiate the motor drive with the clutch in position to rotate spiral tube 16 so as to wind line onto the reel. The winding continues until the drogue is pulled into casing 3 and, in particular, until plunger 46 of the ejector mechanism strikes an automatic switch 57 which normally projects interiorly into the path of the plunger. The function of switch 57 is to automatically shut off the motor and, of course, to stop the winding of the line onto the reel. The switch is positioned so that the plunger end of the ejector compresses coil spring 48 in preparation for the next ejection. At this point it may be recalled that hydrophone array 4 is coupled to the drogue by a line 7 which, as stated, preferably is a resilient line formed of a material such as polypropylene that is capable of substantial stretching movement. One reason for the resiliency arises because of a possible override of spiral tube 16 which may wind an extra length of line onto the reel. In this event, the polypropylene line simply stretches and avoids possible breakage.

When it desired to again deploy the tow, the motor can be started by providing a override switch (not shown) on the control panel of the apparatus. The override again starts the motor, the clutch of which is positioned to pay out the line and the initial slack produced in the line that is sufficient to permit plunger 46 to move rearwardly sufficiently to again permit switch 57 to close. The operator can then open the override switch and the drive will continue to pay out the line. It also is advisable to provide the reel itself with the switch so that when the line is fully extended, the switch can open and shut off the power supply of the motor. It is believed that the implementation of such motor controls is well within ordinary skill and should require no detailed description.

One of the principal advantages of the present apparatus is the use of the particular type of stationary reel and its rotating spiral tube to either pay out or wind on the tow line. Since the only rotating mechanism is the horizontal shaft of the spiral tube it will be apparent that the power required for such rotation is very substantially less than the power which would otherwise be required to rotate a large reel. As a result of the power reduction, slip rings and other electrical connections can be eliminated so as to reduce the noise which otherwise would be generated. Submarines, of course, must operate as silently as possible. Further, since the reel is not rotated and is relatively small, it can be mounted exteriorly of the submarine if such is desired. As an alternative practice, a reel can be mounted interiorly of the submarine and the line lead exteriorly through suitable glands in the hull. In this event, the line could be pulled off of the reel or wound onto it by running it through a ptss between a pair of driven rollers mounted exteriorly of the hull. The operator interiorly of the submarine then guides the line onto the reel as it is fed into the interior of the submarine.

Another feature is the use of drogue stowage funnel 3 which, when disposed at the rearward end of the submarine, prevents fouling of the tow line by the ship's propeller. The funnel is particularly advantageous for use with the type of reel which has been specifically described since the tow line then can be held in a taut position between the reel and the stowed drogue.

Obviously many modifications and variations of the present invention are possible in the light of the above teachings. It is therefore to be understood that within the scope of the appended claims the invention may be practiced otherwise than as specifically described.

What is claimed is:

1. Underwater towing apparatus for use on submarines and the like comprising:
   a reel disposed medially of the submarine,
   a tow line wound on said reel,
   means for paying out said tow line from said reel,
   a flexible line-like transducing member carried by the tow line,
   drogue means for tensioning the tow,
   line means coupling said drogue and said transducer member,
   a casing adapted to stowably receive the drogue, said casing being carried externally of the submarine on its rearward end, and
   means for ejecting the stowed drogue from said casing, said ejector means including:
   an elongate hollow tubular member having an enlarged piston-like rearward end slidably mounted in said drogue casing and bearing against said drogue,
   support means for said tubular member,
   resilient means acting on the piston-like end of the tubular member for normally urging said member rearwardly of said casing,
   said tubular member being hollow for receiving said coupling line means whereby when said tow line is paid out said transducing member and tow line pass through the tubular member and through said casing,
   means for admitting the water medium into the casing forwardly of said piston-like end for permitting the water pressure to cooperate with said resilient means for moving said tubular member rearwardly of said drogue casing, and
   means for limiting the rearward stroke distance of said tubular member, said means being disposed for arresting said member in a drogue-ejecting position at the rearward end of the casing.

2. The apparatus of claim 1 wherein the forward end of said tubular member is provided with an outwardly-projecting radial flange and said support means for said member includes:
   a cylindrical casing disposed concentrically about the member and having its rearward end projecting into the forward end of the casing,
   said stroke-limiting means being an inwardly extending flange carried by said concentric casing and said inward flange additionally providing an abutment for said resilient means and a support for said member,
   said tubular member flange slidably engaging said concentric casing and being disposed for engaging said limiting means for determining the drogue-ejecting position.

3. The apparatus of claim 1 wherein said drogue coupling line means is a semiresilient line and said tow line pay out means is electrically driven, said apparatus further including a switch means projecting into said drogue casing in the path of travel of said piston-like end of said shaft for controlling the electrical drive.

4. The apparatus of claim 1 wherein said drogue casing is formed with a funnel-shaped rearward end and said drogue provided with a plurality of arms resiliently held in radially-outward positions for tensioning the tow, said arms being collapsible for stowage purposes.

5. The apparatus of claim 1 wherein said reel is a stationary member mounted externally of the submarine hull and said means for paying out said tow line includes:
   a driven shaft,
   means rotatably supoprting the shaft in a horizontal position axially aligned with said reel,
   means for driving the shaft in opposite rotational directions,
   a hollow spiralled guide means rotatably carried by said driven shaft and having one of its ends projecting into and extending concentrically within a rearward end of the horizontal shaft,
   the other end of said guide means being formed as a tube radially disposed of the reel in proximity to its periphery to receive line from the reel or to wind the line onto the reel depending upon the rotational direction of the shaft drive whereby said line can be paid out and reeled in.

6. The apparatus of claim 5 further including means for constantly reciprocating said spiralled tow line guide means relatively to said rotatably driven shaft as said shaft is rotated whereby the tube end of said guide means has the position of its axis constantly reciprocating horizontally of the line-receiving surface of the reel.

7. The apparatus of claim 6 wherein said driven shaft includes a forwardly-disposed driven section and a rearwardly disposed section keyed to and telescopically engaging said driven section.
   said rearward section carrying said spiralled guide means and having a portion of its extent provided with secrew threads,
   said apparatus further including fixed dog-like means engaging said threads, whereby when said driven shaft section is rotated said rearward section and said guide means are reciprocated.

8. The apparatus of claim 7 wherein said screw threads are formed for causing each successive loop wound onto said reel to be spaced laterally of its preceding loop whereby successive loops criss-cross and bind preceding loops.

No references cited.

MILTON BUCHLER, *Primary Examiner.*

T. M. BLIX, *Assistant Examiner.*